(12) United States Patent
Sandoval et al.

(10) Patent No.: US 12,098,474 B2
(45) Date of Patent: Sep. 24, 2024

(54) ACID MIST SUPPRESSION IN COPPER ELECTROWINNING

(71) Applicant: FREEPORT MINERALS CORPORATION, Phoenix, AZ (US)

(72) Inventors: Scot Philip Sandoval, Tucson, AZ (US); Stanberg Lee Tallman, Phoenix, AZ (US); William Duane Sanders, Morenci, AZ (US); Ephrem Lemlem Gebrehiwot, Vail, AZ (US); Aron Tyab, Thatcher, AZ (US)

(73) Assignee: FREEPORT MINERALS CORPORATION, Phoenix, AZ (US)

( * ) Notice: Subject to any disclaimer, the term of this patent is extended or adjusted under 35 U.S.C. 154(b) by 0 days.

(21) Appl. No.: 18/492,514

(22) Filed: Oct. 23, 2023

(65) Prior Publication Data

US 2024/0052514 A1    Feb. 15, 2024

Related U.S. Application Data

(63) Continuation of application No. 17/961,871, filed on Oct. 7, 2022, now Pat. No. 11,807,952.

(60) Provisional application No. 63/297,842, filed on Jan. 10, 2022, provisional application No. 63/253,349, filed on Oct. 7, 2021.

(51) Int. Cl.
| | |
|---|---|
| *C25C 1/00* | (2006.01) |
| *C25C 1/12* | (2006.01) |
| *C25C 7/06* | (2006.01) |
| *C25D 3/38* | (2006.01) |

(52) U.S. Cl.
CPC ............ *C25D 3/38* (2013.01); *C25C 1/12* (2013.01); *C25C 7/06* (2013.01)

(58) Field of Classification Search
CPC .................................. C25C 1/12; C25C 7/06
See application file for complete search history.

(56) References Cited

U.S. PATENT DOCUMENTS

| | | |
|---|---|---|
| 1,678,776 A | 7/1928 | Gravell et al. |
| 4,484,990 A | 11/1984 | Bultman et al. |
| | (Continued) | |

FOREIGN PATENT DOCUMENTS

| | | |
|---|---|---|
| EP | 0488862 | 6/1992 |
| RU | 2133301 C1 | 7/1999 |
| | (Continued) | |

OTHER PUBLICATIONS

Tmakova, Lenka et al: "Plant-derived Surfactants as an Alternative to Synthetic Surfactants: Surface and Antioxidant Activities"; Chemical Papers, Accepted Aug. 2, 2015; DOI: 10.1515/chempap-2015-0200.

(Continued)

*Primary Examiner* — Zulmariam Mendez
(74) *Attorney, Agent, or Firm* — SNELL & WILMER L.L.P.

(57) ABSTRACT

A method of acid mist suppression in copper electrowinning is described. In various embodiments, at least one liquid licorice root extract, powdered licorice root extract, or reconstituted licorice extract is added in an amount sufficient to the acidic electrolyte solution of the copper electrowinning process to suppress acid mist from the acidic electrolyte solution during the copper electrowinning process. In various embodiments, combinations of licorice extract and surfactant show synergies in acid mist suppression during copper electrowinning.

21 Claims, 3 Drawing Sheets

(56) References Cited

U.S. PATENT DOCUMENTS

| | | | |
|---|---|---|---|
| 4,880,565 | A | 11/1989 | Rose et al. |
| 5,468,353 | A | 11/1995 | Anich et al. |
| 8,343,326 | B2 | 1/2013 | Virnig et al. |
| 9,074,292 | B2 | 7/2015 | Virnig et al. |
| 9,714,218 | B2 | 7/2017 | Virnig et al. |
| 11,807,952 | B2 | 11/2023 | Sandoval et al. |
| 2004/0149589 | A1 | 8/2004 | San Martin et al. |
| 2008/0031906 | A1 | 2/2008 | Nohata et al. |
| 2010/0178367 | A1 | 7/2010 | Saxena et al. |
| 2015/0291516 | A1 | 10/2015 | Virnig et al. |
| 2023/0110076 | A1 | 4/2023 | Sandoval et al. |
| 2023/0111432 | A1 | 4/2023 | Sandoval et al. |

FOREIGN PATENT DOCUMENTS

| | | |
|---|---|---|
| RU | 2690329 | 5/2019 |
| WO | WO2007052330 | 4/2009 |
| WO | WO2023059872 | 4/2023 |

OTHER PUBLICATIONS

Al Shakarji, Reza: "Mechanisms of Acid Mist Formation in Electrowinning"; Feb. 2012, PhD Thesis, James Cook University, Australia.

Dhak, D. et al.: "An Investigation on the Effects of Organic Additives on Zinc Electrowinning from Industrial Electrolyte"; The Electrochemical Society, Conference Paper in ECS Transactions, 28 (6) 267-280—Jan. 2010.

Cheng, C.Y. et al.: "Evaluation of Saponins as Acid Mist Suppressants in Zinc Electrowinning"; Hydrometallurgy (www.elsevier.com/locate/hydromet), Hydrometallurgy 73 (2004) pp. 133-145.

Gunjal, Sachin Kumar D. et al.: "Optimizations of Spray Drying Process Parameters for Liquorice (Glycyrrhiza glabra Linn.) Extract"; (www.rjptonline.org), Research J. Pharm. and Tech. 11(11) Nov. 2018, pp. 5105-5110.

Alfantazi, A.M. et al.: "Foaming behavior of surfactants for acid mist control in zinc electrolysis processes"; Hydrometallurgy (www.elsevier.com/locate/hydromet), Hydrometallurgy 69 (2003) pp. 57-72.

PCT Notification of Transmittal of the International Search Report and Written Opinion of the International Searching Authority, or the Declaration with International Search Report and Written Opinion dated Mar. 1, 2023 issued in PCT/US2022/046030.

USPTO Office Action from U.S. Appl. No. 17/961,871 dated Feb. 6, 2023.

USPTO Non Final Office Action from U.S. Appl. No. 17/961,871 dated Mar. 16, 2023.

USPTO Final Office Action from U.S. Appl. No. 17/961,871 dated Jul. 5, 2023.

FIG.3

ACID MIST SUPPRESSION IN COPPER ELECTROWINNING

CROSS-REFERENCE TO RELATED APPLICATIONS

This application is a continuation of and claims priority to and the benefit of U.S. Non-Provisional patent application Ser. No. 17/961,871 filed Oct. 7, 2022, with a U.S. Pat. No. of 11,807,952 and will issue on Nov. 7, 2023, entitled "Acid Mist Suppression in Copper Electrowinning," (the "'871 Application"), and U.S. Provisional Patent Application Ser. No. 63/297,842 filed Jan. 10, 2022, entitled "Acid Mist Suppression in Copper Electrowinning," (the "'842 Application"), and U.S. Provisional Patent Application Ser. No. 63/253,349 filed Oct. 7, 2021, entitled "Acid Mist Suppression in Copper Electrowinning," (the "'349 Application"), the disclosures of which are incorporated herein by reference in their entireties for all purposes.

FIELD

The present disclosure generally relates to acid mist suppression in metal recovery processes, and in particular to acid mist suppression in copper electrowinning.

BACKGROUND

Electrowinning is the process by which metals are recovered from aqueous electrolyte solutions previously obtained from extraction of the metal ion from an acidic or basic leach solution. Electrowinning in aqueous sulfuric acid electrolyte solution necessarily results in oxygen evolution from the anode. This evolving gas rises as gas bubbles that vigorously rupture at the surface, promoting release of a noxious acrid aerosol commonly referred to as "acid mist." Acid mist is a serious health hazard to workers. Acid mist is known to irritate skin, eyes, nasal passages, and the entire respiratory tract. Given the need to mitigate this serious human health hazard, devices have been designed to collect, filter and/or trap acid mist. Additionally, it was recognized that additives capable of producing a stable layer of foam on the surface of the electrolyte solution can mitigate acid mist production. Foaming additives work to suppress acid mist by blanketing the breaking gas bubbles under a foam layer.

Surfactants are known to reduce surface tension of aqueous solutions and, in some cases, provide foam having various surface coverage, thickness, and stability. Theoretically, foam volume increases when newly entrapped air from mechanical agitation or gas incorporation is unable to coalesce with the large air-water interface. The foamability of surfactant solutions is thoroughly reviewed by B. Petkova, et al., "Foamability of aqueous solutions: Role of surfactant type and concentration," *Advances in Colloid and Interface Science*, 276, February 2020, 102084, https://doi.org/10.1016/j.cis.2019.102084. These authors studied the main surface characteristics controlling foamability of various anionic, cationic, and nonionic surfactants.

Surfactants for acid mist suppression in electrowinning are characterized for their chemical stability and their ability to generate stable foams having wide surface coverage. As an example, 3M™ Acid Mist Suppressant FC-1100 (a fluorochemical surfactant available from the 3M Company and disclosed in U.S. Pat. No. 5,468,353) has been used in copper electrowinning for at least the past 20 years and has been recognized as an effective sulfuric acid mist suppressant in copper electrowinning tank houses. Surfactant concentrations of about 10 ppm active solids are known to reduce the measured level of sulfuric acid mist in the tank house by as much as 50%.

Nevertheless, there is an ongoing need to find alternative surfactants usable for acid mist suppression in copper electrowinning that are environmentally friendly and reasonably stable in the electrowinning conditions. Particularly desirable are biosurfactants, such as might be found naturally occurring in the plant kingdom, and that are capable of the same foamability and stability as synthetic surfactants designed for the same purpose but are available for considerably less cost.

SUMMARY

It has now been discovered that licorice extracts effectively suppress acid mist in copper electrowinning. While not bound by any theory, the observed effectiveness of licorice extracts is both entirely unexpected and due to components of such extracts, as will be described herein below. This is, in part because, licorice extracts previously known to suppress acid mist in zinc (Zn) electrowinning fail to efficiently suppress acid mist in copper (Cu) electrowinning, nor have components thereof.

In various embodiments, licorice (*Glycyrrhiza glabra*) extracts find a new and nonobvious use as acid mist suppressants in copper electrowinning.

In various embodiments, acid mist formed during a copper electrowinning process is suppressed by including at least one licorice extract in the acidic electrolyte solution of the electrowinning process. In other examples, acid mist formed during a copper electrowinning process is suppressed by including at least one or more components of at least one licorice extract. In various embodiments, acid mist may be suppressed by the bioactives present in such acidic electrolyte solutions.

In various embodiments, a method of suppressing acid mist in copper electrowinning comprises adding at least one licorice extract to the acidic electrolyte solution of the copper electrowinning process.

In various embodiments, a composition for acid mist suppression in a copper electrowinning process comprises an effective amount of glycyrrhizin, based on the total weight of the composition, an effective amount of another bioactive, based on the total weight of the composition, and a surfactant.

In various embodiments, the composition comprises reconstituted licorice root extract further comprising water, a powdered licorice extract, and optionally a preservative, the powdered licorice extract having on the order of about ≥8 wt. % glycyrrhizin, based on the total weight of the powdered licorice root extract.

In various embodiments, the powdered licorice extract has on the order of about 11.5 wt. % glycyrrhizin, based on the total weight of the powdered licorice root extract.

In various embodiments, the powdered licorice root extract comprises an effective amount of glycyrrhizin, based on the total weight of the powdered licorice root extract.

In various examples, a method of suppressing acid mist liberated from an acidic electrolyte solution in a copper electrowinning process comprises adding a liquid licorice extract, a powdered licorice extract, a reconstituted licorice extract, or a mixture thereof, to the acidic electrolyte solution in an amount sufficient to provide acid mist suppression during the copper electrowinning process.

In various examples, the powdered licorice extract is obtained by drying the liquid licorice extract in a spray drying operation.

In various examples, the powdered licorice root extract used in the process of making the reconstituted licorice root extract exhibits a pH of 4.5 to 6 for a 1 wt. % aqueous solution, a moisture content of about 3-7 wt. %, and a bulk density of about 0.5 g/mL.

In various examples, a method of suppressing acid mist liberated from an acidic electrolyte solution in a copper electrowinning process comprises adding a reconstituted licorice root extract to the acidic electrolyte solution in an amount sufficient to provide acid mist suppression during the electrowinning process, wherein the reconstituted licorice root extract is made by a process comprising the steps of: chopping licorice root into matchstick sized pieces; exposing the resulting licorice root pieces to heated water to obtain a liquid licorice root extract; removing substantially all of the water by spray drying to obtain a powdered licorice root extract; and dissolving the powdered licorice root extract in water to obtain the reconstituted licorice root extract added to the acidic electrolyte solution.

In various examples, the acidic electrolyte solution is recycled back to a stripping stage whereby the reconstituted licorice root extract thus added to the acidic electrolyte solution shortens a phase break time required for phase separation of a loaded organic phase comprising chelated $Cu^{2+}$ ions and the recycled acidic electrolyte solution.

BRIEF DESCRIPTION OF THE DRAWING FIGURES

The subject matter is pointed out with particularity and claimed distinctly in the concluding portion of the specification. A more complete understanding, however, may best be obtained by referring to the detailed description and claims when considered in connection with the following drawing figures:

DETAILED DESCRIPTION

The detailed description of exemplary embodiments makes reference to the accompanying drawings, which show exemplary embodiments by way of illustration and their best mode. While these exemplary embodiments are described in sufficient detail to enable those skilled in the art to practice the invention, it should be understood that other embodiments may be realized and that logical, chemical, and mechanical changes may be made without departing from the spirit and scope of the inventions. Thus, the detailed description is presented for purposes of illustration only and not of limitation. For example, unless otherwise noted, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In various embodiments, acid mist formed during a copper electrowinning process is suppressed by including at least one *Glycyrrhiza glabra* (licorice) extract in the electrolyte solution of the electrowinning process. As described in detail herein below, the at least one licorice extract preferably comprises an aqueous reconstituted licorice extract formed by a method comprising dissolving a powered licorice extract into water and optionally adding a preservative.

Definitions and Interpretations

As used herein, "copper electrowinning" refers to a copper electrolysis process where copper is electrolytically deposited in cells comprised of insoluble lead anodes and stainless-steel cathodes. A high voltage current is applied across the cells and the copper is deposited cathodically from a sulfuric acid-based electrolyte solution. The copper electrolyte is then circulated through the electrowinning tankhouse where the $Cu^{2+}$ is electrolytically reduced to $Cu^0$ for copper cathode production. The electrochemical reaction at the anode generates $O_2$ from the breakdown of water and this gas evolution is what produces the fine sulfuric acid aerosol in the tankhouse known as acid mist. The overall electrochemical reaction is $2H_2O+2CuSO_4=2Cu^0+O_2+2H_2SO_4$.

As used herein, "acidic electrolyte solution," "electrolyte solution" or "electrolyte solution for/of/used in an electrowinning process," refers to an acid based aqueous solution described above under copper electrowinning.

As used herein, the term "licorice" (optionally presented with the British spelling, liquorice) refers to *Glycyrrhiza glabra*, a flowering plant of the bean family Fabaceae. The root of this plant provides various licorice extracts unexpectedly found to act as acid mist suppressants in copper electrowinning. Licorice is a source of proteins, amino acids, polysaccharides, simple sugars, mineral salts (e.g., calcium, phosphorus, sodium, potassium, iron, magnesium, silicon, selenium, manganese, zinc, and copper), pectin, resins, starches, sterols, gums, estrogens, tannins, phytosterols (e.g., sitosterol and stigmasterol), coumarins, vitamins (e.g., B1, B2, B3, B5, E, and C), glycosides, triterpenes, saponins, and flavonoids. The licorice saponins are glucuronides, with the aglycone portion of the saponins being oleananes (triterpenoid). A triterpenoid glucuronide constituent of licorice root is the triterpene saponin glycyrrhizin, which may be present at about 2 to about 15% of the dry root weight.

As used herein, the term "licorice extract" refers to a mixture of naturally occurring substances, such as those delineated above, removed from licorice root by various processes. A licorice extract for use herein may be in liquid form (with the extraction solvent), a dried solids form, such as a powder, having been prepared from a liquid extract by evaporation of the extraction solvent used to prepare the liquid extract, or in a reconstituted form, having been prepared by re-dissolving a dried extract into a solvent. Extraction of natural products from plant material is a well-known process in natural products chemistry, and in some instances, an extract may comprise natural products dissolved in a solvent such as water. In a non-limiting example, macerated, shredded, or chopped licorice root may be placed in a Soxhlet extractor or other suitable extraction apparatus, even a vat, and exposed to a heated or boiling solvent such as hot water. The solvent is washed over the root material until enough of the desired natural products dissolve in the solvent. This operation can be agitated as necessary, and the extraction liquid recycled as needed. In other examples, extraction may be at ambient conditions, such as simply covering chopped up biomass with water or other solvent and letting it sit for hours or days or months. The resulting extract may then be analyzed for the presence of, and/or amount of, one or more phytochemicals of interest, e.g., a saponin or a flavonoid. The extract may then be standardized if desired to a target wt. % for one or more of these natural products, such as by diluting with additional solvent or evaporating some of the existing solvent off to concentrate the extract down to a target wt. % for the desired phytochemical constituent(s). In some instances, a liquid extract may be evaporated down to dryness (in vacuo, such as by freeze drying, spray drying, or by some other method) to leave behind a powdered mixture also referred to herein as an "extract" or, more precisely, a "dry extract," "powdered extract," or an "extract powder." Crystals or crude solids that might result from certain evaporation processes may of course be ground into powders as desired. A powdered extract may be stored in its raw form in closed containers, bags, sacks, etc. However, as discussed below, powdered licorice extracts have been found to be very hygroscopic, and thus difficult to use in electrowinning processes in this physical form.

As used herein, the term "reconstituted extract" refers to an aqueous extract mixture prepared by dissolving a powdered extract into water. Since a reconstituted extract may be prone to bacteria and/or mold growth, a suitable preservative may be added to the reconstituted extract in order to maintain a desired shelf life. A reconstituted extract may be stored in pails, tanks, totes, etc. As discussed further below, a reconstituted licorice extract provides an advantage to the equivalent powdered licorice extract in that clumping can be avoided and the raw material added more reliably and with greater ease to electrowinning systems.

As used herein, the term "surfactant" takes on its ordinary meaning in surface science and physical chemistry. A surfactant herein generally comprises a surface-active agent that is soluble in an acidic electrolyte solution of a copper electrowinning process, and that is capable of forming a foam layer on a least a portion of the surface of the acidic electrolyte solution so as to suppress acid mist from the copper electrowinning. In various embodiments, synergistic effects may be seen for particular combinations of licorice root extract and surfactant used for acid mist suppression in copper electrowinning. Surfactants for use herein include both synthetic and natural substances, with surfactants in either group comprising any one of nonionic, cationic, anionic, or amphoteric surfactants. A non-limiting example of a natural surfactant is a fatty acid obtained from an animal or a plant source. Synthetic surfactants are understood to possibly contain naturally sourced fragments, such as for example, fatty alcohol ethoxylates, wherein the "fatty alcohol" portion of the molecule may have been derived from a naturally sourced fatty acid rather than petroleum sources, with the final surfactant obtained by ethoxylation of the reduced fatty acid. Surfactants for use herein may also comprise substances having atoms other than C, H, N, S, and O. Stated another way, surfactants of interest in acid mist suppression herein may include any suitable surfactant, including, but not limited to halogen heteroatoms such as, for example, F or Cl. In various embodiments, a surfactant may comprise a fluorinated surfactant (a fluorosurfactant) or a chlorinated surfactant (a chlorosurfactant). In various embodiments, a surfactant comprises a mixture of surfactants, such as a hydrocarbon surfactant and a fluorosurfactant. Many surfactants are acid stable, and thus compatible for use in acid electrolyte solutions, such as, for example, amine oxides, fatty acids, alkyl sulfonic acids, aryl sulfonic acids such as diphenyl ether disulfonates, and fluorinated surfactants, among others. Various surfactants for use herein may be protonated or neutralized once exposed to an acidic electrolyte solution in copper electrowinning.

As used herein, the term "an amount sufficient" refers to the weight percentage (or ppm based on weight) of a licorice extract, surfactant, or combination of licorice extract and surfactant, sufficient to suppress acid mist generation in copper electrowinning. For example, an amount sufficient for a licorice extract is that amount of licorice extract (necessary to create a layer of foam on an acidic electrolyte solution during electrowinning and effectively suppress acid mist from the copper electrowinning to at least some measurable degree compared to the same copper electrowinning process without the licorice extract present in the acidic electrolyte solution. Also, for example, an amount sufficient for a surfactant herein would be that amount of surfactant (reported in wt. % or ppm) necessary to create a layer of foam on an acidic electrolyte solution during electrowinning and effectively suppress acid mist from the copper electrowinning to at least some measurable degree compared to the same copper electrowinning process without the surfactant present in the acidic electrolyte solution. Similarly, an amount sufficient for a combination of licorice extract and surfactant herein would be that amount of the combined licorice extract and surfactant (reported in wt. % or ppm) necessary to create a layer of foam on an acidic electrolyte solution during electrowinning and effectively suppress acid mist from the copper electrowinning to at least some measurable degree compared to the same copper electrowinning process without the combination of licorice extract and surfactant present in the acidic electrolyte solution.

As used herein, the term "an effective amount," when used in the context of glycyrrhizin, refers to an amount (wt. %, ppm) of glycyrrhizin that has been found effective in acid mist suppression regardless of its botanical source. Therefore, in various examples, if a licorice extract, or other composition, is used to effectively suppress acid mist from a copper electrowinning process to at least some measurable degree, the ingredients of that licorice extract or other composition described herein, are present in an amount sufficient. In other words, botanical biomass, other composition, or extract therefrom besides licorice root extract may be found to be a viable source of "an effective amount" of glycyrrhizin found to aid in acid mist suppression.

A biomass or extract therefrom, such as a licorice extract, may be part of a composition for acid mist suppression in electrowinning, and therefore the "effective amount" of glycyrrhizin may be based on the total weight of the composition, rather than based on the total weight of the biomass or extract.

In various embodiments, and without limiting the generality of the foregoing, a licorice extract or other biomass or extract therefrom found useful in acid mist suppression in copper electrowinning comprises "an effective amount of glycyrrhizin, based on the total weight of the licorice extract and/or other biomass or extract therefrom."

In various embodiments, the effective amount of glycyrrhizin may be on the order of about ≥9 wt. %, based on the total weight of the powdered licorice extract. In various embodiments, the effective amount of glycyrrhizin may be on the order of about ≥10 wt. %, based on the total weight of the powdered licorice extract. In various embodiments, the effective amount of glycyrrhizin may be on the order of about ≥11 wt. %, based on the total weight of the powdered licorice extract. In various embodiments, the effective amount of glycyrrhizin may be, on average, about 11.5 wt. %, based on the total weight of the powdered licorice extract.

As used herein, the terms "an effective amount of other bioactive compounds," or "an effective amount of another bioactive compound," when used in the context of an amount of a bioactive in a licorice root extract or other biomass or extract therefrom or composition therewith, refers to an amount of the bioactive in the licorice root extract or other biomass or extract therefrom or composition therewith that has been found effective in acid mist suppression. Such bioactive compounds may fall into several classes of compounds, including flavanones, flavones, flavanonols, chalcones, isoflavans, isoflavenes, isoflavones, and isoflavanones, with some being glycosides and others not. For example, some species include, but are not limited to, liquiritin, liquiritin apioside, isoliquiritin, isoliquiritin apioside, neoisoliquiritine, isoliquiritigenin, formononetin, licuraside, licochalcone A, and licochalcone C. Thus, for example, another bioactive of interest in acid mist suppression may be a biosurfactant other than glycyrrhizin and may be present in an effective amount in acid mist suppression, recognizing that this other bioactive may be provided to the electrowinning process by using a licorice extract or some other biomass or extract therefrom or a composition comprising the licorice extract or some other biomass or extract therefrom.

As used herein, the acronym "ppm" takes on its ordinary meaning of "parts per million" by weight. Thus, weight percent (wt. %) is easily converted to ppm by multiplying the wt. % value by a factor of 10,000. Similarly, to convert from ppm to weight percent wt. %, the value in ppm is divided by a factor of 10,000.

GENERAL EMBODIMENTS

In various embodiments, acid mist in a copper electrowinning process is suppressed by having at least one licorice extract, at least one surfactant, or a combination of at least one licorice extract and at least one surfactant in the copper electrowinning process.

In various embodiments, acid mist in a copper electrowinning process is suppressed by including at least one licorice extract, at least one surfactant, or a combination of at least one licorice extract and at least one surfactant in the electrolyte solution of the copper electrowinning process in an amount sufficient to suppress acid mist.

In various embodiments, acid mist in a copper electrowinning process is suppressed by including at least one licorice extract and a surfactant, and optionally an effective amount of another bioactive compound. For example, such surfactant may be selected from a fluoroaliphatic surfactant having the structure $C_4F_9SO_2N(C_2H_4COOH)C_3H_6N(CH_3)_2$, 3,3'-oxybis(2-dodecylbenzenesulfonic acid), sodium $C_9$-$C_{22}$ alkyl (secondary) sulfonate, a fluorinated alkyl amide surfactant, and mixtures thereof.

In various embodiments, a licorice extract provides at least some visible foaming during at least a portion of the time duration of the copper electrowinning process. As foaming diminishes, additional licorice extract can be added to the process. In various embodiments, metered amounts of a licorice extract are continuously added to a copper electrowinning electrolyte solution over the course of the copper electrowinning process. For liquid licorice extracts and reconstituted licorice extracts, a pail, pump or other suitable delivery device, manual or automatic, may be used to add in the liquid extract material at a particular rate or rates over the course of the copper electrowinning. Addition of a liquid licorice extract or a reconstituted licorice extract into an electrolyte solution may be at a uniform and continuous rate, or may be a single event, or intermittent as needed over the course of the copper electrowinning process.

In various embodiments, a licorice extract used in an electrolyte solution at an amount sufficient to suppress acid mist during copper electrowinning provides a foam layer that extends across at least 50% of the surface area of the electrolyte solution (i.e., across the air-liquid interface). In various embodiments, a foam layer provided by a phytochemical extends across at least 50%, at least 55%, at least 60%, at least 65%, at least 70%, at least 75%, at least 80%, at least 85%, at least 90%, at least 95%, at least 96%, at least 97%, at least 98%, or at least 99% of the air-liquid interface of the electrolyte solution.

In various embodiments, an amount sufficient for a licorice extract to suppress acid mist generation in copper electrowinning is from about 0.1 ppm (0.00001 wt. %) to about 100,000 ppm (10 wt. %) of licorice extract solids, based on the total weight of the electrolyte solution used in the copper electrowinning process. The licorice extract solids may be provided to the electrolyte solution used in copper electrowinning in the form of a liquid licorice extract, a powdered licorice extract made by drying a liquid licorice extract, or a reconstituted licorice extract made by dissolving a powdered licorice extract in water for easier handling.

In preferred embodiments, an amount sufficient for a licorice extract to suppress acid mist generation in copper electrowinning is from about 10 ppm to about 30 ppm of licorice extract solids, based on the total weight of the electrolyte solution. Since a powdered licorice extract is considered to be 100% solids, the preferred amount of powdered licorice extract to suppress acid mist in an electrowinning process is from about 10 ppm to about 30 ppm. For both liquid licorice extracts and reconstituted licorice extracts, the preferred amounts (ppm) will necessarily be higher since these liquid products are not 100% licorice extract solids.

The use of licorice extract for acid mist suppression in zinc electrowinning has been described previously. For example, licorice extract is described as being "a common mist suppressant in Zinc EW today," (see page 144, (2013) Acid Mist Abatement in Base Metal Electrowinning. In: Battle, T., et al., (eds) Ni—Co 2013. Springer, Cham. https://doi.org/10.1007/978-3-319-48147-0_9).

As a notable example, the licorice extract designated FL5025 available from MAFCO Worldwide LLC is currently used as an effective acid mist suppressant in zinc electrowinning. However, and entirely contrary to the current teaching of its effectiveness in zinc electrowinning, this particular licorice extract is inefficient at acid mist suppression in copper electrowinning, as shown in the Test Results herein. This licorice extract is described herein below along with other licorice root extracts having different active compositions.

In the study herein, other licorice extracts have been unexpectedly found to outperform FL5025 and other licorice extracts in acid mist suppression during copper electrowinning.

Licorice Extracts

In various embodiments, a copper electrowinning process includes at least one licorice extract to suppress acid mist, wherein the at least one licorice extract is present in the copper electrowinning process in an amount sufficient to suppress acid mist in the copper electrowinning process.

In various embodiments, an acidic electrolyte solution for copper electrowinning comprises at least one licorice extract to suppress acid mist. In various embodiments, the at least one at least one licorice extract is present in the electrolyte solution at an amount sufficient to suppress acid mist in a copper electrowinning process using the electrolyte solution.

In various embodiments, a method of suppressing acid mist from an electrolyte solution used in a copper electrowinning process comprises adding at least one licorice extract to the electrolyte solution.

In various embodiments, the licorice extract for use in copper electrowinning comprises a liquid licorice root extract, a powdered licorice root extract, or a reconstituted licorice root extract.

In various embodiments, a liquid licorice root extract for acid mist suppression is prepared by a method comprising: macerating, shredding, or chopping licorice root (*Glycyrrhiza glabra*); and exposing the resulting licorice root to ambient or heated water to obtain the liquid licorice root extract.

In various embodiments, a powdered licorice root extract for acid mist suppression is prepared by a method comprising: macerating, shredding, or chopping licorice root (*Glycyrrhiza glabra*); exposing the resulting licorice root to ambient or heated water to obtain a liquid licorice root extract; and removing substantially all of the water to obtain the powdered licorice root extract.

In various examples, removal of water from a liquid licorice root extract comprises spray drying. The product from spray drying a liquid licorice root extract is a powdered licorice root extract. Spray drying of licorice root extracts is described, for example, in S. K. D. Gunjal, et al., "Optimizations of Spray Drying Process Parameters for Liquorice (*Glycyrrhiza glabra Linn.*) Extract," *Research J. Pharm and Tech.*, 11(11), 5105-5110, (2018). However, since spray dried licorice root extracts are reconstituted for easier handling in accordance with the present disclosure, there is typically no need for drying agents to be incorporated in the spray drying process, per Gunjal, et al. Therefore, preferred spray dried licorice root extracts for use herein may typically have higher bulk densities than the spray dried licorice root extracts used directly into tobacco flavoring, for example.

In various embodiments, a reconstituted licorice root extract for acid mist suppression is prepared by a method comprising: macerating, shredding, or chopping licorice root (*Glycyrrhiza glabra*); exposing the resulting licorice root to ambient or heated water to obtain a liquid licorice root extract; removing substantially all of the water to obtain a powdered licorice root extract; and dissolving the powdered licorice root extract in water to obtain the reconstituted licorice root extract.

Liquid licorice root extract, powdered licorice root extract, and reconstituted licorice root extract, each prepared by the above processing methods, may be used alone or in combination at an amount sufficient in an electrolyte copper electrowinning solution for acid mist suppression.

Any single, or combination of, liquid licorice root extract, powdered licorice root extract, or reconstituted licorice root extract, each prepared by the above processing methods, may be used in combination with a surfactant at a total amount sufficient in an electrolyte copper electrowinning solution for acid mist suppression. In various examples, a surfactant in combination with a licorice extract may comprise a fluorosurfactant or a non-fluorinated surfactant.

Reconstituted licorice root extract is particularly useful for acid mist suppression in copper electrowinning. Reconstituted licorice root extract provides ease of addition to copper electrowinning processes, such as by use of a metering pump, and avoids the clumping issues seen with powdered licorice root extracts that are known to be hygroscopic. Since an electrowinning tankhouse is necessarily humid due to the heated electrolyte solutions, hygroscopic powdered licorice root extracts clump in the humid conditions, rendering their use as acid mist suppressants problematic. Further, as mentioned, a higher bulk density and hygroscopicity can be tolerated by avoidance of spray drying desiccants since the extracts can be reconstituted into reconstituted licorice extracts.

In various embodiments, the concentration of reconstituted licorice root in the copper electrowinning process may be adjusted to achieve an optimized result for the suppression of acid mist. In various embodiments, the electrolyte solution may comprise a concentration of licorice extract solids in the range of about 10 ppm to about 30 ppm, to about 12 ppm to 14 ppm, preferably on the order of about 13 ppm. Therefore, in examples where a reconstituted licorice extract comprises about 35 to 45 wt. % of a powdered licorice extract, the concentration of the reconstituted licorice extract in the copper electrowinning process needs to be from about 20 ppm to about 85 ppm such that the equivalent concentration of the powdered licorice extract in the process is from about 10 ppm to about 30 ppm.

In various embodiments, licorice root extracts are chosen for use in acid mist suppression based on, at least in part, the glycyrrhizin level present in the *Glycyrrhiza glabra* root extract. Glycyrrhizin is a mixture of triterpenoid saponins occurring naturally in licorice root. Glycyrrhizin is typically present in the root as a mixture of potassium, calcium, and magnesium salts of glycyrrhizic acid. These triterpenoid saponins can be biosurfactants, and thus in various examples it may be beneficial to cultivate, identify, and/or source licorice root extracts comprising certain effective levels of glycyrrhizin.

*Glycyrrhiza glabra* root (as dried botanical matter) typically contains about 16 wt. % glycyrrhizin and, depending on the extraction method and processing steps thereafter, such as drying, varying amounts of glycyrrhizin will be found present in an extract. See, for example, T. K. Lim, "*Glycyrrhiza glabra*", Edible Medicinal and Non-Medicinal Plants. 2015 Oct. 22: 354-457. This reference reports that some commercial licorice extracts in Japan were found to contain 10.9-77.4% glycyrrhizin. This reference also reports that Chinese *G. glabra* root was found to contain the highest levels of glycyrrhizic acid, followed by those in Calabria, Italy.

In various examples, the level of glycyrrhizin in a powdered licorice root extract is determined by HPLC. For this purpose, the LC 300 HPLC System from Perkin Elmer® was used in various examples herein. The column for HPLC was the Brownlee Aquapore RP-300 column, which is generally used in analytical chemistry for separation of large biomolecules. Powdered samples were dissolved in pH=2.5 phosphate buffer for glycyrrhizin quantification in the sample. The prominent peak eluting at about 56 minutes from the column is glycyrrhizin. Quantification is performed by interpolating a standard graph created by measuring peak area of known concentrations of glycyrrhizin.

TABLE 1 sets forth powdered licorice root extracts obtained commercially for comparison in acid mist suppression. The table also provides a cross-reference to the experiments performed using these extracts (explained in Test Results herein below).

TABLE 1

Glycyrrhizin levels in various licorice root extracts

| Powdered Extract Ref. No. | Glycyrrhizin Levels | Glycyrrhizin (Average) | Used in Experiment No(s): |
|---|---|---|---|
| A | 0.1 to 4.0 wt. % | 2.05 wt. % | 3, 6 |
| B | 6.0 to 11.0 wt. % | 8.5 wt. % | 4 |
| C | 8.0 to 15 wt. % | 11.5 wt. % | 5, 7, 10, 11 |
| D | 6.5 to 15.0 wt. % | 10.75 wt. % | 8 |

Powdered licorice extract A having 0.1 to 4.0 wt. % glycyrrhizin was obtained from MAFCO under product name FL5025. Powdered licorice extract B having 6.0 to 11.0 wt. % glycyrrhizin was obtained from MAFCO under product name FL5026. Powdered licorice extract C having 8.0 to 15 wt. % glycyrrhizin was obtained from MAFCO under product name FL5027. Powdered licorice extract D having 6.5 to 15.0 wt. % glycyrrhizin was obtained from MAFCO under product name FL5028. All licorice extract powders are assigned the common CAS No. 68916-91-6.

In various examples, a powdered licorice extract for acid mist suppression comprises an effective amount of glycyrrhizin, based on the total weight of the powdered licorice extract. An effective amount is defined herein above under Definitions, recognizing the levels of glycyrrhizin reported for the extracts of TABLE 1 are ranges that overlap, and that the averages presented in the table are mathematical averages calculated for each range.

Specific Embodiment of a Reconstituted Licorice Root Extract for Acid Mist Suppression in Copper Electrowinning Of particular use as an acid mist suppressant in copper electrowinning is a reconstituted licorice root extract prepared by dissolving a powdered licorice extract, such as a powdered extract from TABLE 1, into water.

A preferred reconstituted licorice root extract is prepared by a method comprising: macerating, shredding, or chopping licorice root (*Glycyrrhiza glabra*) into matchstick sized pieces; exposing the resulting licorice root pieces to ambient or heated water to obtain a liquid licorice root extract; removing substantially all of the water by spray drying to obtain a powdered licorice root extract; and dissolving the powdered licorice root extract at 35 wt. % or 45 wt. % in water to obtain the reconstituted licorice root extract having 35 wt. % or 45 wt. % solids, respectively.

An intermediate powdered licorice root extract for preparing a reconstituted extract exhibits a pH of 4.5 to 6 (for a 1% by weight aqueous solution), a moisture content of about 3-7 wt. %, and a bulk density of about 0.5 g/mL. As noted above, the bulk density of various powdered licorice extracts for use herein may not be representative of spray dried extracts used in various flavoring applications such as tobacco additives.

Preservatives for Use in Reconstituted Licorice Root Extracts

For reconstituted licorice root extracts, a preservative is included to mitigate bacteria and/or mold growth in the aqueous solution. This ensures a suitable shelf life when a reconstituted licorice root extract is stored in a tote or other container for use in copper electrowinning.

A preservative for use herein may be any preservative typically used in foods, beverages, pharmaceuticals, soaps and detergents, personal care products, and the like.

Preservatives for use in a reconstituted licorice root extract of the present disclosure include, but are not limited to, benzoic acid, benzyl alcohol, benzylhemiformal, benzylparaben, 5-bromo-5-nitro-1,3-dioxane, 2-bromo-2-nitropropane-1,3-diol, butyl paraben, phenoxyethanol, methyl paraben, propyl paraben, diazolidinyl urea, benzoic acid, potassium benzoate, sodium benzoate, calcium benzoate, calcium propionate, caprylyl glycol, biguanide derivatives, phenoxyethanol, captan, chlorhexidine diacetate, chlorhexidine digluconate, chlorhexidine dihydrochloride, chloroacetamide, chlorobutanol, p-chloro-m-cresol, chlorophene, chlorothymol, chloroxylenol, m-cresol, o-cresol, DEDM hydantoin, DEDM hydantoin dilaurate, dehydroacetic acid, diazolidinyl urea, dibromopropamidine diisethionate, DMDM hydantoin, glyceryl caprylate, sorbic acid, sodium sorbate, potassium sorbate, calcium sorbate, copper sulfate, copper chloride, copper naphthenate, copper azole, sodium nitrite, potassium nitrite, sodium nitrate, potassium nitrate, calcium phosphate, butylated hydroxy toluene, butylated hydroxy anisole, erythorbic acid, salicylic acid, hexamidine, capryloyl glycine, 1,2 hexanediol, undecylenoyl glycine, ethylhexylglycerin, caprylhydroxamic acid, methylpropanediol, hinokitiol, sodium hinokitiol, phenylethyl alcohol, levulinec acid, p-anisic acid, 2-bromo-2-nitropropane-1,3-diol, sodium hydroxymethylglycinate, iodopropynyl butylcarbamate, methylchloroisothiazolinone, methylisothiazolinone, piroctone olamine, cinnamon oil, rosemary extract, and the like.

In various embodiments, and depending on the nature of the preservative, a preservative may be present in a reconstituted (aqueous) licorice root extract at from about 0.0001 wt. % to about 10 wt. %, such as about 0.001 wt. %, 0.01 wt. %, 0.05 wt. %, 0.1 wt. %, 0.5 wt. %, 1 wt. %, 5 wt. %, 7 wt. %, etc., based on the total weight of the reconstituted licorice extract.

In various embodiments a preservative for use herein preferably comprises copper sulfate or potassium sorbate. The use of copper sulfate provides the added advantage that the copper ions are available for electrowinning and are not otherwise superfluous to the electrowinning process.

In various embodiments, a reconstituted licorice root extract for acid mist suppression comprises from about 0.01 wt. % to about 1.0 wt. % copper sulfate or potassium sorbate.

In various embodiments, a reconstituted licorice root extract for acid mist suppression comprises about 0.1 wt. % copper sulfate.

In various embodiments, a reconstituted licorice root extract for acid mist suppression comprises about 0.2 wt. % potassium sorbate.

In various embodiments, an electrolyte solution in a copper electrowinning process comprises a reconstituted licorice root extract present in the electrolyte solution in an amount sufficient to suppress acid mist generation during the copper electrowinning process, wherein the reconstituted licorice root extract is made by a process comprising the steps of: chopping licorice root (*Glycyrrhiza glabra*) into matchstick sized pieces; exposing the resulting licorice root pieces to heated water to obtain a liquid licorice root extract; removing substantially all of the water by spray drying to obtain a powdered licorice root extract; and dissolving the powdered licorice root extract in water to obtain the reconstituted licorice root extract. In various embodiments, the powdered licorice root extract comprises an effective amount of glycyrrhizin, based on the total weight of the powdered licorice extract, and in various embodiments, a pH of 4.5 to 6 for a 1 wt. % aqueous solution, a moisture content of about 3-7 wt. %, and a bulk density of about 0.5 g/mL. In various embodiments, the reconstituted licorice root extract comprises 35 wt. % or 45 wt. % of the powdered licorice root extract in water. In various embodiments, the reconstituted licorice root extract further comprises a preservative.

In various embodiments, an electrolyte solution in a copper electrowinning process comprises a preserved reconstituted licorice root extract present in the electrolyte solution in an amount sufficient to suppress acid mist generation during the copper electrowinning process, wherein the reconstituted licorice root extract is made by a process comprising the steps of: chopping licorice root (*Glycyrrhiza glabra*) into matchstick sized pieces; exposing the resulting licorice root pieces to ambient or heated water to obtain a liquid licorice root extract; removing substantially all of the water by spray drying to obtain a powdered licorice root extract; dissolving the powdered licorice root extract in water to obtain a reconstituted licorice root extract; and adding a preservative to the reconstituted licorice root extract to obtain the preserved reconstituted licorice root extract. In various embodiments, the powdered licorice root extract exhibits a pH of 4.5 to 6 for a 1 wt. % aqueous solution, a moisture content of about 3-7 wt. %, and a bulk density of about 0.5 g/mL. In various embodiments, the powdered licorice root extract comprises an effective amount of glycyrrhizin, based on the total weight of the powdered licorice extract. In various embodiments, the spray drying step does not include a desiccant. In various embodiments, the reconstituted licorice root extract comprises 35 wt. % or 45 wt. % powdered licorice root extract in water. In various embodiments, the preservative is selected from potassium sorbate and copper sulfate.

In various embodiments, an acid mist suppressant for copper electrowinning comprises a preserved 45 wt. % reconstituted licorice root extract made by a process comprising the steps of: chopping licorice root (*Glycyrrhiza glabra*) into matchstick sized pieces; exposing the resulting licorice root pieces to ambient or heated water to obtain a liquid licorice root extract; removing substantially all of the water by spray drying to obtain a powdered licorice root extract; dissolving the powdered licorice root extract in water to obtain a 45 wt. % reconstituted licorice root extract; and adding 0.1 wt. % copper sulfate to the 45 wt. % reconstituted licorice root extract to obtain the preserved 45 wt. % reconstituted licorice root extract. In various embodiments, the powdered licorice root extract exhibits a pH of 4.5 to 6 for a 1 wt. % aqueous solution, a moisture content of about 3-7 wt. %, and a bulk density of about 0.5 g/mL. In various embodiments, the powdered licorice root extract comprises an effective amount of glycyrrhizin, based on the total weight of the powdered licorice extract. In various embodiments, the spray drying step does not include a desiccant. In various embodiments, the reconstituted licorice root extract comprises 35 wt. % or 45 wt. % powdered licorice root extract in water.

In various embodiments, an acid mist suppressant for copper electrowinning comprises a preserved 35 wt. % reconstituted licorice root extract made by a process comprising the steps of: chopping licorice root (*Glycyrrhiza glabra*) into matchstick sized pieces; exposing the resulting licorice root pieces to ambient or heated water to obtain a liquid licorice root extract; removing substantially all of the water by spray drying to obtain a powdered licorice root extract; dissolving the powdered licorice root extract in water to obtain a 35 wt. % reconstituted licorice root extract; and adding 0.2 wt. % potassium sorbate to the 35 wt. % reconstituted licorice root extract to obtain the preserved 35 wt. % reconstituted licorice root extract. In various embodiments, the powdered licorice root extract exhibits a pH of 4.5 to 6 for a 1 wt. % aqueous solution, a moisture content of about 3-7 wt. %, and a bulk density of about 0.5 g/mL. In various embodiments, the powdered licorice root extract comprises an effective amount of glycyrrhizin, based on the total weight of the powdered licorice extract. In various embodiments, the spray drying step does not include a desiccant.

Surfactants for Use as Acid Mist Suppressants

In various embodiments, various fluorosurfactants find use in acid mist suppression during copper electrowinning. In various aspects, a fluorosurfactant is used at an amount sufficient to promote acid mist suppression during copper electrowinning. As discussed further herein, the amount sufficient for acid mist suppression can be reduced by use of at least one licorice root extract.

In various embodiments, a fluorosurfactant for use herein comprises a fluoroaliphatic surfactant.

In various embodiments, a fluoroaliphatic surfactant having the fluoroalkyl acrylate chemical structure $C_4F_9SO_2N(C_2H_4COOH)C_3H_6N(CH_3)_2$ is used at an amount sufficient for acid mist suppression in copper electrowinning. This surfactant is available, for example, from 3M under the trade name 3M™ Acid Mist Suppressant FC-1100. Other fluorosurfactants disclosed in U.S. Pat. No. 5,468,353 find use in acid mist suppression during copper electrowinning.

In various embodiments, other fluorosurfactants for use as acid mist suppressants include fluorinated alkyl amides. These substances comprise the general structure $R^1$—$(C=O)N(R^2)(R^3)$, wherein any of the three substituent groups on the amide functionality, namely $R^1$, $R^2$ and $R^3$, may be H, alkyl, fluorinated alkyl, or perfluorinated alkyl. Alkyl is broadly meant to include substituents having intervening heteroatoms such as O, S, and N anywhere along a linear or branched hydrocarbon moiety.

In various embodiments, a fluorinated alkyl amide for use as an acid mist suppressant in copper electrowinning is available, for example, under the trade name VANMIST 500 from W-Tech Technologies Ltd.

In various embodiments, surfactants that are not fluorinated also find use as acid mist suppressants for copper electrowinning. These surfactants may be referred to as non-fluorinated surfactants. In various aspects, a non-fluorinated surfactant is used at an amount sufficient to promote acid mist suppression during copper electrowinning.

In various embodiments, non-fluorinated surfactants for use herein include, but are not limited to, alkyl sulphonic acids (or their corresponding alkyl sulfonate salts) and aryl sulphonic acids (or their corresponding aryl sulfonate salts). A sulfonate is understood to mean a compound having at least one —$SO_3^-$ or —$SO_3H$ substituent. In some instances, for example, a non-fluorinated surfactant for use herein may comprise a bis-sulfonic acid (or the corresponding disulfonate).

In various embodiments, sodium dodecyl diphenyl oxide disulfonate (CAS No. 25167-32-2), a type of aryl sulfonate, finds use as an acid mist suppressant in copper electrowinning. This surfactant is available, for example, as a 45% actives solution under the trade name Calfax® DB-45 from Pilot Chemical or under the trade name Dowfax® 2A1 from Dow Chemical. The equivalent protonated substance can also be used interchangeably, namely 3,3'-oxybis(2-dodecylbenzenesulfonic acid) (CAS No. 30260-73-2). The sodium disulfonate species is likely converted entirely to the bis-sulfonic acid species upon exposure to highly acidic electrolyte solution used in copper electrowinning.

In various embodiments, sodium $C_9$-$C_{22}$ alkyl (secondary) sulfonate (CAS No. 68188-18-1), an aliphatic sulfonate, finds use as an acid mist suppressant in copper electrowinning. The "secondary" label indicates the sulfonate substituent is bonded to an interior carbon atom along the $C_9$-$C_{22}$ chain so that each of the sulfonates in the distribution are secondary alkyl sulfonates. This surfactant is available, for example, as 95-100% pure material (solid, powdered) under the trade name MERSOLAT® H95 from LANXESS Corporation, Pittsburg, PA. Typically, the chain length range is $C_9$-$C_{22}$ with an average chain length of $C_{15}$.

In various embodiments, a surfactant mixture may be used as an acid mist suppressant in copper electrowinning. In various embodiments, such a mixture may be commercially available so as to avoid having to mix surfactant species together prior to, or during, copper electrowinning.

In various embodiments, a mixture of a non-fluorinated surfactant and a fluorinated surfactant is used for acid mist suppression in copper electrowinning.

For example, a mixture of sodium dodecyl diphenyl oxide disulfonate (or 3,3'-oxybis(2-dodecylbenzenesulfonic acid)) and a fluorinated alkyl amide surfactant or a fluoroaliphatic surfactant such as $C_4F_9SO_2N(C_2H_4COOH)C_3H_6N(CH_3)_2$ find use in acid mist suppression during copper electrowinning. In various examples, this mixture may be prepared by combining sodium dodecyl diphenyl oxide disulfonate (e.g., Dowfax® 2A1) and the fluoroaliphatic surfactant $C_4F_9SO_2N(C_2H_4COOH)C_3H_6N(CH_3)_2$ (e.g., FC-1100 from 3M®).

In various embodiments, the mixture of sodium dodecyl diphenyl oxide disulfonate and fluorinated alkyl amide surfactant $C_4F_9SO_2N(C_2H_4COOH)C_3H_6N(CH_3)_2$ is available as a commercial product. This exemplary mixture of sodium dodecyl diphenyl oxide disulfonate and fluoroaliphatic surfactant $C_4F_9SO_2N(C_2H_4COOH)C_3H_6N(CH_3)_2$ is available under the trade name VANMIST 210 from W-Tech Technologies Ltd.

In various embodiments, the concentration of surfactant in the copper electrowinning process may be adjusted to achieve an optimized result for the suppression of acid mist. In various embodiments, the electrolyte solution of the copper electrowinning process may comprise a concentration of surfactant in the range of about 1 ppm to about 10 ppm, to about 2 ppm to about 8 ppm, preferably on the order of about 2 to about 6 ppm.

Surfactant/Licorice Extract Synergies

It has now been surprisingly discovered that certain combinations of a surfactant or a surfactant mixture and licorice extract show synergies in acid mist suppression during copper electrowinning.

In various embodiments, a licorice extract and a surfactant provide an unexpected synergistic effect in acid mist suppression, meaning that a combination of the licorice extract and the surfactant outperform either individual additive used at the same amount (wt. % or ppm) as the combination. For example, a licorice extract and a surfactant in combination may provide 95% acid mist suppression when used in combination at a concentration of about 13 ppm licorice extract and about 2 ppm surfactant (for a resulting active component concentration of 15 ppm acid mist suppressant), whereas the same licorice extract at an active component concentration about 21 ppm provides 85% acid mist suppression and the same surfactant at an active component concentration of about 6 ppm provides 66% acid mist suppression, wherein 95%>66% and 95%>85%. In other words, the acid mist suppression obtained by the combination is more than simply additive, and thus more than expected, or synergistic. In the case of a fluorinated surfactant, the cost of a fluorinated surfactant is roughly five times higher than the cost of licorice extract. Decreasing the amount of fluorinated surfactant required is economically favorable.

In various embodiments, a licorice root extract performs synergistically in combination with either a fluorinated surfactant or a non-fluorinated surfactant.

In various embodiments, a licorice root extract performs synergistically in combination with a mixture of a fluorinated surfactant and a non-fluorinated surfactant.

In various embodiments, a powdered licorice root extract C (from TABLE 1), or a reconstituted licorice extract obtained therefrom, performs synergistically in combination with a surfactant mixture of sodium dodecyl diphenyl oxide disulfonate and fluoroaliphatic surfactant $C_4F_9SO_2N(C_2H_4COOH)C_3H_6N(CH_3)_2$ (such as, for example, VANMIST 210).

In various embodiments, a powdered licorice root extract C (from TABLE 1), or a reconstituted licorice extract obtained therefrom, performs synergistically in combination with a fluorinated alkyl amide surfactant (such as, for example, VANMIST 500 from W-Tech Technologies, Ltd.).

In various embodiments, a powdered licorice root extract C (from TABLE 1), or a reconstituted licorice extract obtained therefrom, performs synergistically in combination with the fluoroaliphatic surfactant $C_4F_9SO_2N(C_2H_4COOH)C_3H_6N(CH_3)_2$, (such as 3M™ Acid Mist Suppressant FC-1100).

In various embodiments, a powdered licorice root extract C (from TABLE 1), or a reconstituted licorice extract obtained therefrom, performs synergistically in combination with sodium $C_9$-$C_{22}$ alkyl (secondary) sulfonate, CAS No. 68188-18-1 (such as, for example, MERSOLAT® H95 from LANXESS Corporation, Pittsburg, PA).

Effect of Licorice Extracts on Phase Break Time

It has also been surprisingly discovered that licorice extracts have a beneficial effect on phase break time when used for acid mist suppression in copper electrowinning as compared to a flurosurfactant in the same process.

The typical hydrometallurgical solvent extraction process consists of two stages: extraction and stripping. During extraction, the pregnant leach solution, which contains both valuable metal ions and various detrimental impurities, is vigorously mixed with an organic solvent, allowing the metal ions to migrate from the leach solution into the organic solvent, leaving the impurities in the leach solution. The now barren leach solution and loaded organic are then allowed to separate based on solubility, with the barren leach solution recycled into the leaching process, and the loaded organic proceeding to the stripping stage. During stripping, the loaded organic is mixed with an aqueous stripping solution which allows the metal ions to migrate from the loaded organic into the aqueous phase. The now barren organic and resulting loaded electrolyte are allowed to separate based on solubility, with the barren organic recycled into the solvent extraction process, and the electrolyte proceeding to an electrowinning plant for copper plating.

The amount of time it takes for organic and aqueous phases to separate is commonly referred to as a phase break time. If the phase break time is too long, there may be insufficient time available in a commercial process to reach the complete separation desired as the process moves further. This may lead to situations where phases remain entrained within each other, resulting in complications across the hydrometallurgical process and ultimately decreasing production and overall metal quality.

Surprisingly, tests set forth in the Test Results herein below demonstrated that the addition of licorice extract (e.g., extract C from TABLE 1) in the solvent extraction process improved the separation of the organic and aqueous phases by decreasing the phase break time (i.e., shortening the time for full separation). Since phase break time is a measure of how long it takes for the organic and aqueous phases to separate, it is desirable to decrease the time it takes for full separation, and it has now been observed that a licorice extract can decrease the phase break time so that it is not undesirably long.

In various embodiments, a method of shortening phase break time in a stripping stage of an electrowinning process, the stripping stage including phase separation of a mixture comprising a loaded organic phase and an aqueous stripping solution phase, the method comprising adding a licorice extract in an amount sufficient to (a) the aqueous stripping solution phase; (2) the mixture; or (3) an acidic aqueous electrolyte solution used in the electrowinning process, prior to the phase separation to shorten the phase break time of the mixture.

In various embodiments, the amount of licorice extract sufficient to shorten phase break time is from about 2 ppm to about 200 ppm powdered licorice extract, based on the total weight of the two-phase mixture. In various embodiments, the powdered licorice extract comprises an effective amount of glycyrrhizin, based on the total weight of the powdered licorice extract.

In various embodiments, the loaded organic phase comprises an hydroxyphenyl oxime complexed with $Cu^{2+}$ ions. In various examples, the aqueous stripping solution phase comprises the acidic electrowinning solution returning from electrowinning. In these examples, the licorice extract may already be present in the electrowinning process for purposes of acid mist suppression and is thus available in the returning electrolyte solution to beneficially shorten phase break time.

Test Results

Individual Acid Mist Suppressants

Various licorice extracts per TABLE 1 were tested to determine their use as acid mist suppressants, compared to the 3M™ Acid Mist Suppressant FC-1100. As noted, these licorice extracts for testing comprise differing levels of the triterpene saponin glycyrrhizin. The licorice extracts tested, designated A, B, C, and D, were obtained as powders. Although the testing used powdered licorice extracts, the licorice extract designated C (TABLE 1) was later incorporated into a preserved 35 wt. % reconstituted licorice root extract as prepared by the aforementioned process and was tested using the same procedures.

Experimental copper electrowinning was carried out in a continuous solvent extraction/electrowinning pilot plant containing about 37,000 liters of electrowinning electrolyte solution. The temperature of the copper electrowinning solution was kept at 45° C. (+/−1° C.) by means of an electric heater. The electrolyte solution consisted of 180 g/L of sulfuric acid (having been added as 95-98% $H_2SO_4$) and 40 g/L Cu (having been added as $CuSO_4.5H_2O$). Cobalt was also included (in the form of $CoSO_4$) to depolarize the electrodes. The electrolyte solution consisted of typical plant water. Lead anodes and 316L stainless steel cathodes were used. The copper was deposited on both sides of the cathode having a total surface area (both sides combined) of 2 $m^2$.

In these tests, the 3M™ Acid Mist Suppressant FC-1100 was incorporated in the electrolyte solution at an active component concentration of about 6 ppm. The powdered licorice extracts were each incorporated in the electrolyte solution at an active component concentration of 21 ppm (i.e., 21 ppm of each test extract as a powdered licorice extract).

Figure 1:
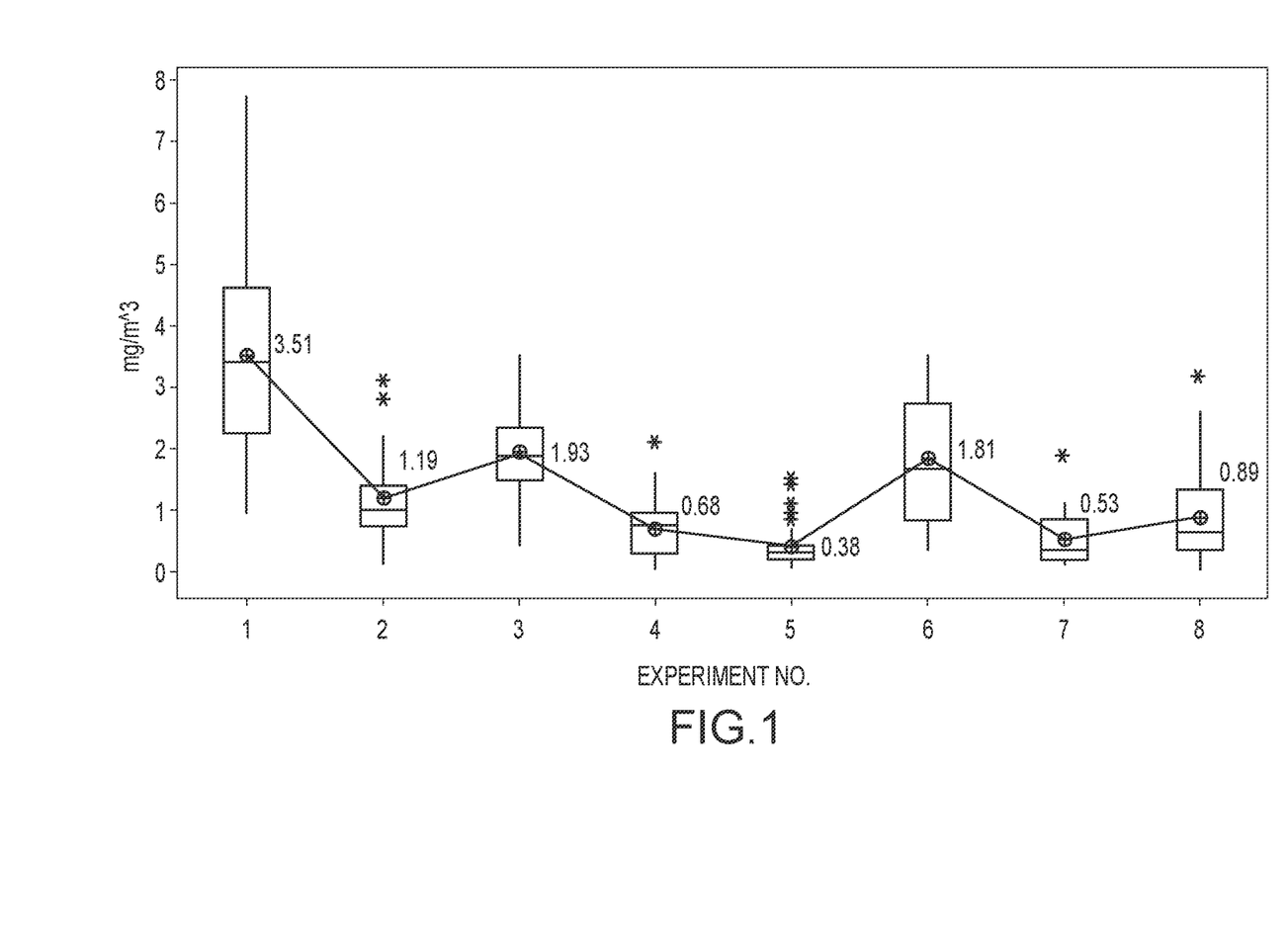
FIG. 1 illustrates a comparison of acid mist suppression levels in copper electrowinning for various acid mist suppressants.

Acid mist was measured by sampling the air about 1 foot above the electrolyte solution level during 8 hours of copper electrowinning and reported in the units of $mg/m^3$ of air. The various experiments are delineated in TABLE 2 and the results are shown in the graph of FIG. 1.

TABLE 2

Experiments using licorice extracts of varying glycyrrhizin levels

| Experiment No. | Conditions | Acid Mist Suppression $mg/m^3$ |
|---|---|---|
| 1 | Baseline - control | — |
| 2 | 3M ™ FC-1100 | 1.19 |
| 3 | Extract A (trial 1) | 1.93 |
| 4 | Extract B | 0.68 |
| 5 | Extract C (trial 1) | 0.38 |
| 6 | Extract A (trial 2) | 1.81 |
| 7 | Extract C (trial 2) | 0.53 |
| 8 | Extract D | 0.89 |

The "baseline" data point refers to an experiment having no acid mist suppressant present in the electrolyte solution. The results in TABLE 2 and FIG. 1 suggest that the licorice extract with the highest average level of glycyrrhizin, (powdered licorice extract C from TABLE 1), provided the highest level of acid mist suppression, not only outperforming the 3M™ Acid Mist Suppressant FC-1100 but also outperforming each of the other powdered licorice extracts A, B, and D. The experiments have good reproducibility, as evidenced by comparing repeat Experiment Nos. 3 and 6 and repeat Experiment Nos. 5 and 7. Further, a plot of acid mist suppression (using the TABLE 2 data, $mg/m^3$) versus average glycyrrhizin levels (calculated in TABLE 1) for licorice extracts A, B, C, and D can be fit with a linear trendline ($R^2$=0.8832). Such a plot shows that if glycyrrhizin levels are greater than about 8 wt. %, the acid mist suppression is less than about 1 $mg/m^3$, and that licorice extracts having even higher levels of glycyrrhizin may perform even better in acid mist suppression, although it is uncertain whether an upper limit exists.

As mentioned above, MAFCO FL5025, (powdered licorice extract A in TABLE 1), known to be a highly effective acid mist suppressant for zinc electrowinning, was inefficient in acid mist suppression in copper electrowinning, as shown by the results presented in FIG. 1. This could indicate some unknown peculiarity with copper electrowinning versus zinc electrowinning, or empirically, a requirement that the licorice extract used for acid mist suppression in copper electrowinning comprise an effective amount of glycyrrhizin, although this appears to not be a requirement for acid mist suppression in zinc electrowinning.

Synergistic Combinations of Acid Mist Suppressants

Figure 2:
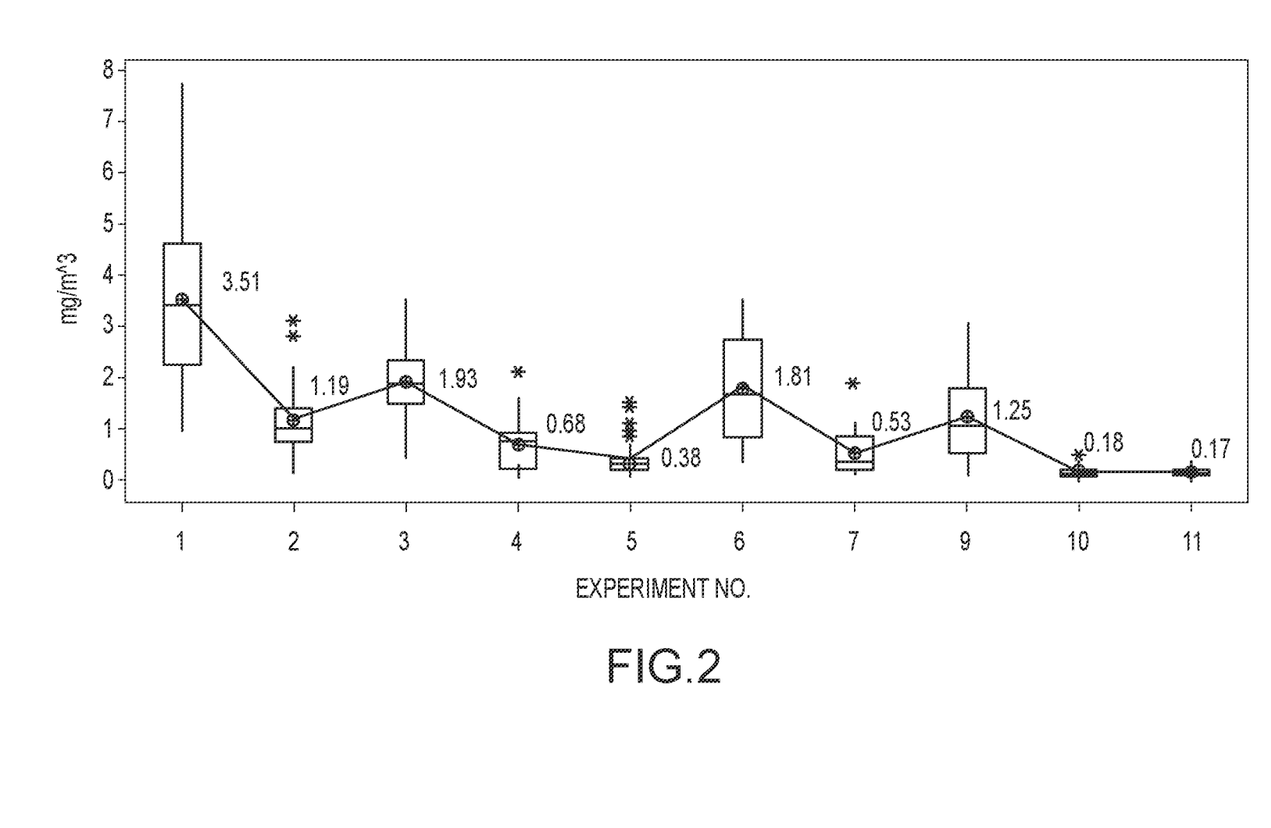
FIG. 2 illustrates a comparison of acid mist suppression levels in copper electrowinning for various acid mist suppressants and combinations thereof.

Various acid mist suppressants were tested alone and in combination under the same conditions as described above. Acid mist was again measured by sampling the air about 1 foot above the electrolyte solution level during 8 hours of copper electrowinning and reported in the units of mg/m³ of air. The results are shown in the graph of FIG. 2. Note that the first seven experiments presented in FIG. 2 are the same as FIG. 1 but are duplicated here so that the synergistic effect can be more appreciated. The various experiments are delineated in TABLE 3 and the results are shown in the graph of FIG. 2.

TABLE 3

Synergistic Combinations

| Experiment No. | Conditions | Acid Mist Suppression mg/m³ |
|---|---|---|
| 1-7 | See TABLE 1/FIG. 1 | See TABLE 1/FIG. 1 |
| 9 | Mixture of sodium dodecyl diphenyl oxide disulfonate and fluoroaliphatic surfactant $C_4F_9SO_2N(C_2H_4COOH)C_3H_6N(CH_3)_2$ | 1.25 |
| 10 | Powdered licorice extract C (TABLE 1) in combination with sodium dodecyl diphenyl oxide disulfonate and fluoroaliphatic surfactant $C_4F_9SO_2N(C_2H_4COOH)C_3H_6N(CH_3)_2$ | 0.18 |
| 11 | Powdered licorice extract C (TABLE 1) in combination with sodium $C_9$-$C_{22}$ alkyl (secondary) sulfonate, CAS No. 68188-18-1 | 0.17 |

For Experiment No. 9, the mixture of sodium dodecyl diphenyl oxide disulfonate and fluoroaliphatic surfactant $C_4F_9SO_2N(C_2H_4COOH)C_3H_6N(CH_3)_2$ was provided by using VANMIST 210, incorporated in the electrolyte solution alone at an active component concentration of 6 ppm. The powdered licorice extract used in Experiments Nos. 10 and 11 was powdered licorice extract C from TABLE 1. The combination of additives in Experiment No. 10 was provided by using 13 ppm of powdered licorice extract C and 2 ppm VANMIST 210 for a total active component concentration of 15 ppm. The combination of additives in Experiment No. 11 was provided by using 13 ppm of powdered licorice extract C and 2 ppm MERSOLAT® H95 for a total active component concentration of 15 ppm.

As shown in TABLE 3 and FIG. 2, the results show a licorice extract/surfactant synergy in acid mist suppression. The combination of powdered licorice extract in combination with sodium dodecyl diphenyl oxide di sulfonate and fluoroaliphatic surfactant $C_4F_9SO_2N(C_2H_4COOH)C_3H_6N(CH_3)_2$ resulted in 0.18 mg/m³ of captured acid mist, compared to 0.53 mg/m³ for the powdered licorice extract used alone and 1.25 mg/m³ for the surfactant mixture of sodium dodecyl diphenyl oxide disulfonate and fluoroaliphatic surfactant $C_4F_9SO_2N(C_2H_4COOH)C_3H_6N(CH_3)_2$ used alone.

Further shown in TABLE 3 and FIG. 2, the results show that powdered licorice extract in combination with sodium $C_9$-$C_{22}$ alkyl (secondary) sulfonate (CAS No. 68188-18-1) resulted in 0.17 mg/m³ of captured acid mist, compared to the 0.53 mg/m³ for the same powdered licorice extract used alone.

Phase Break Time

In a phase break time experiment, a powdered licorice extract (extract C from TABLE 1) was tested to determine its impact on phase break time, compared to phase break time when using the fluoroaliphatic surfactant $C_4F_9SO_2N(C_2H_4COOH)C_3H_6N(CH_3)_2$ (3M™ Acid Mist Suppressant FC-1100). Experimental phase separation was conducted by placing 250 mL of organic, 250 mL of aqueous, and the indicated amount (FIG. 3, ppm) of chosen acid mist suppressant into a beaker. The solutions were then mixed for 2 minutes at a speed of 300 rpm by an agitator fitted to the beaker. After mixing ceased, the phase break time was recorded using a stopwatch. The phase break time as defined in this test is the time at which the organic and the aqueous were fully separated by solubility, wherein the phase interface between the organic and aqueous was visibly clear.

Figure 3:
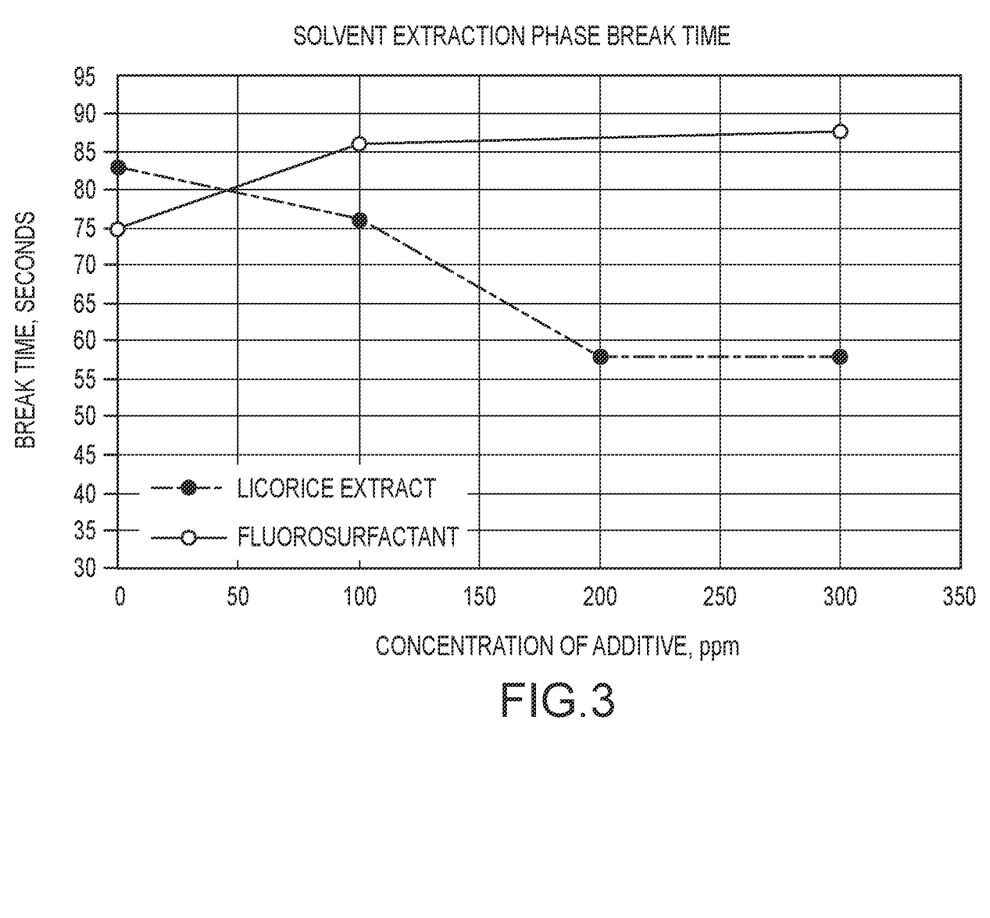
FIG. 3 illustrates a comparison in solvent break times between various levels of licorice extract and fluorocarbon surfactant in an electrowinning (EW) process.

As shown in FIG. 3, the addition of ≥200 ppm licorice extract shortened the phase break time on the order of about 25 seconds, with the effect leveling off with additional additive. Comparatively, the addition of ≥100 ppm of the industry-standard fluoroaliphatic surfactant (3M™ Acid Mist Suppressant FC-1100) showed much poorer performance, actually lengthening phase break time on the order of about 10 to 12 seconds, as shown. This unexpected characteristic can reduce the entrainment of impurities in the electrolyte solution used in the electrowinning process, improving metal quality and increasing production capacity.

In the detailed description, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, coupled or the like may include permanent (e.g., integral), removable, temporary, partial, full, and/or any other possible attachment option. Any of the components may be coupled to each other via friction, snap, sleeves, brackets, clips or other means now known in the art or hereinafter developed. Additionally, any reference to without contact (or similar phrases) may also include reduced contact or minimal contact.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

All structural, chemical, and functional equivalents to the elements of the above-described various embodiments that are known to those of ordinary skill in the art are expressly incorporated herein by reference and are intended to be encompassed by the present claims. Moreover, it is not necessary for an apparatus or component of an apparatus, or method in using an apparatus to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a chemical, chemical composition, process, method, article, or apparatus that comprises a list of elements does not include only those elements but may include other elements not expressly listed or inherent to such chemical, chemical composition, process, method, article, or apparatus.

What is claimed is:

1. A system of suppressing acid mist, comprising:
   an electrowinning tankhouse; and
   an acidic electrolyte solution, wherein the acidic electrolyte solution comprises licorice extract solids in an amount sufficient to provide acid mist suppression, wherein the amount sufficient comprises about 0.1 ppm to about 100,000 ppm of licorice extract solids, based on the total weight of the acidic electrolyte solution, wherein the licorice extract solids comprise a liquid licorice extract, a powdered licorice extract, a reconstituted licorice extract, or a mixture thereof, and wherein the powdered licorice extract exhibits a pH of 4.5 to 6 when reconstituted as a 1 wt. % aqueous solution, a moisture content of about 3-7 wt. %, and a bulk density of about 0.5 g/mL.

2. The system of claim 1, wherein the acidic electrolyte solution comprises from about 10 ppm to about 30 ppm licorice extract solids.

3. The system of claim 1, wherein the powdered licorice extract comprises an effective amount of glycyrrhizin, based on the total weight of the powdered licorice extract.

4. The system of claim 1, wherein the powdered licorice extract comprises on the order of about ≥8 wt. % glycyrrhizin, based on the total weight of the powdered licorice extract.

5. The system of claim 1, wherein the acidic electrolyte solution further comprises a surfactant, wherein the surfactant comprises a fluorosurfactant or a non-fluorinated surfactant.

6. The system of claim 5, wherein the surfactant added to the acidic electrolyte solution is from about 1 ppm to about 10 ppm by weight in the acidic electrolyte solution.

7. The system of claim 6, wherein the acidic electrolyte solution further comprises another bioactive compound, the bioactive compound selected from the group consisting of flavanones, flavones, flavanonols, chalcones, isoflavans, isoflavenes, isoflavones, and isoflavanones.

8. The system of claim 1, wherein the acidic electrolyte solution is a copper electrolyte solution.

9. The system of claim 1, wherein the powdered licorice extract comprises on the order of about 11.5 wt. % glycyrrhizin, based on the total weight of the powdered licorice extract.

10. The system of claim 1, wherein the reconstituted licorice extract comprises water, the powdered licorice extract, and optionally a preservative.

11. The system of claim 10, wherein the reconstituted licorice root extract comprises from about 35 wt. % to about 45 wt. % of the powdered licorice root extract, based on the total weight of the reconstituted licorice root extract.

12. The system of claim 11, wherein the reconstituted licorice extract added to the acidic electrolyte solution is from about 20 ppm to about 85 ppm by weight.

13. The system of claim 10, wherein the preservative comprises from about 0.1 wt. % to about 0.2 wt. % of potassium sorbate or from about 0.1 wt. % to about 0.2 wt. % of copper sulfate, based on the total weight of the reconstituted licorice root extract.

14. The system of claim 5, wherein the surfactant is selected from the group consisting of a fluoroaliphatic surfactant having the structure C4F9SO2N(C2H4COOH)C3H6N(CH3)2,3,3'-oxybis(2-dodecylbenzenesulfonic acid), sodium C9-C22 alkyl (secondary) sulfonate, a
fluorinated alkyl amide surfactant, and mixtures thereof.

15. The system of claim 5, wherein the non-fluorinated surfactant comprises alkyl sulphonic acids, aryl sulphonic acids, or their corresponding aryl sulfonate salts.

16. The system of claim 5, wherein the surfactant added to the acidic electrolyte solution is from about 2 ppm to about 8 ppm by weight in the acidic electrolyte solution.

17. The system of claim 1, wherein the liquid licorice extract is prepared by a method comprising:
   macerating, shredding, or chopping licorice root; and
   exposing the resulting licorice root to ambient or heated water to obtain the liquid licorice extract.

18. The system of claim 1, wherein the reconstituted licorice extract is prepared by a method comprising:
   macerating, shredding, or chopping licorice root;
   exposing the resulting licorice root to ambient or heated water to obtain a liquid licorice extract;
   removing substantially all of the water to obtain a powdered licorice extract; and
   dissolving the powdered licorice root extract in water to obtain the reconstituted licorice extract.

19. A system of suppressing acid mist in a copper electrowinning tankhouse, comprising:
   an electrowinning tankhouse; and
   an acidic electrolyte solution, wherein the acidic electrolyte solution comprises licorice extract solids in an amount sufficient to provide acid mist suppression, wherein the amount sufficient comprises about 0.1 ppm to about 100,000 ppm of licorice extract solids, based on the total weight of the acidic electrolyte solution, wherein the acidic electrolyte solution further comprises:

a surfactant, wherein the surfactant comprises a fluorosurfactant or a non-fluorinated surfactant and is added to the acidic electrolyte solution in a concentration from about 1 ppm to about 10 ppm by weight in the acidic electrolyte solution;

an additional bioactive compound, the additional bioactive compound selected from the group consisting of flavanones, flavones, flavanonols, chalcones, isoflavans, isoflavenes, isoflavones, and isoflavanones.

20. A system of suppressing acid mist in a copper electrowinning tankhouse, comprising:

an electrowinning tankhouse; and a copper electrolyte solution, wherein the copper electrolyte solution comprises licorice extract solids in an amount sufficient to provide acid mist suppression, wherein the amount sufficient comprises about 0.1 ppm to about 100,000 ppm of licorice extract solids, based on the total weight of the copper electrolyte solution.

21. A system of suppressing acid mist, comprising:

an electrowinning tankhouse; and a copper electrolyte solution, wherein the copper electrolyte solution comprises:

a licorice extract in a concentration of about 0.1 ppm to about 100,000 ppm based on the total weight of the copper electrolyte solution; and a surfactant in a concentration of about 1 ppm to about 10 ppm, based on the total weight of the copper electrolyte solution;

wherein the licorice extract and the surfactant provide a synergistic effect in acid mist suppression.

* * * * *